United States Patent
Chuang et al.

(10) Patent No.: US 7,099,127 B2
(45) Date of Patent: Aug. 29, 2006

(54) HIGH-SIDE SHORT-CIRCUIT PROTECTION FOR A VOLTAGE CONVERTER

(75) Inventors: Chao-Hsuan Chuang, Hsinchu (TW); Peng-Ju Lan, Taipei (TW); Hsien-Ming Chiu, Taipei (TW); Jing-Meng Liu, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 422 days.

(21) Appl. No.: 10/653,101

(22) Filed: Sep. 3, 2003

(65) Prior Publication Data

US 2004/0047091 A1 Mar. 11, 2004

(30) Foreign Application Priority Data

Sep. 10, 2002 (TW) ............................... 91120681 A

(51) Int. Cl.
 *H02H 7/00* (2006.01)
(52) U.S. Cl. ..................................................... 361/18
(58) Field of Classification Search ................ 361/18, 361/33, 91.1; 323/276; 363/16
 See application file for complete search history.

(56) References Cited

U.S. PATENT DOCUMENTS

| | | | |
|---|---|---|---|
| 5,717,557 A * | 2/1998 | Gonzalez et al. | 361/18 |
| 2004/0233604 A1* | 11/2004 | Beck et al. | 361/100 |
| 2005/0168249 A1* | 8/2005 | Dequina et al. | 327/110 |

\* cited by examiner

*Primary Examiner*—Stephen W. Jackson
*Assistant Examiner*—Boris Benenson
(74) *Attorney, Agent, or Firm*—Rosenberg, Klein & Lee

(57) ABSTRACT

In a voltage converter with a high-side short-circuit protection before an input voltage provided by a high-voltage power supply reaches a first threshold, a driver detects the input voltage and the output voltage of the converter to turn on the low-side transistor of the converter and turn off the high-voltage power supply when the input voltage ranges between the first threshold and a second threshold and the output voltage reaches a third threshold, to thereby avoid damages to the circuit connected to the output node of the converter. The driver comprises a front-end drive circuit to switch the high-side and low-side transistors and a low-voltage logic control circuit for the turning-on of the low-side transistor.

9 Claims, 4 Drawing Sheets

HIGH-SIDE SHORT-CIRCUIT PROTECTION FOR A VOLTAGE CONVERTER

FIELD OF THE INVENTION

The present invention relates generally to a DC-to-DC converter, and more particularly, to a high-side short-circuit protection for a voltage converter.

BACKGROUND OF THE INVENTION

A DC-to-DC buck converter is used to convert an input voltage from a high-voltage power supply to a lower voltage supplied to the circuit or apparatus connected to the output node of the converter. In a converter, a controller is typically used to control a driver to manipulate the high-side and low-side transistors to switch to generate the desired output voltage and current, and generally, the controller and driver are integrated in a single chip. However, the efficiency of the converter is better when the driver is closer to the load connected with the converter, while the controller is more interfered with noise when it is closer to the load.

To solve the above problem, another converter separating the controller and driver to different chips is proposed. Even the original problem is solved, separating the controller and driver introduces new problem. Due to the driver operated only under high voltage, the controller will not provide any control signal to the driver before the input voltage of the converter reaches the predetermined high voltage, and as a result, the switching transistors of the converter cannot be controlled to switch during this period. For an example, as shown in FIG. 1, when power on, the input voltage Vin of the converter rises from 0 V to 9 V and the controller and driver are not operated during this period. If the high-side circuit of the converter is shorted during this period, the input voltage Vin will be connected directly to the output node of the converter and thus damages the load circuit or apparatus connected to the output node of the converter. In other words, the conventional converter lacks of high-side short-circuit protection under abnormal operation period.

Therefore, it is desired a driver with high-side short-circuit protection for a voltage converter.

SUMMARY OF THE INVENTION

An object of the present invention is to provide a high-side short-circuit protection apparatus and method for a voltage converter.

In a voltage converter, according to the present invention, a high-side and low-side transistors are connected in series through an output node and between a high-voltage power supply and reference potential, a driver is connected to the high-side and low-side transistors and the high-voltage power supply, and a controller is connected to the driver. The driver detects the input voltage of the high-side transistor and the output voltage of the output node, and if the output voltage reaches a predetermined threshold during the input voltage rising to another predetermined range, the driver will force the low-side transistor conductive and turn off the high-voltage power supply to avoid damages to the circuit connected to the output node of the converter.

In an embodiment, the driver comprises a power switch apparatus to detect the input voltage and produce a first indication signal, a voltage detector to detect the output voltage and produce a second indication signal, and a judgment apparatus connected with the first and second indication signals. If the output voltage reaches the predetermined threshold during the input voltage in the predetermined range, a short signal will be produced by the judgment apparatus for a low-voltage logic control circuit to turn on the low-side transistor. When the input voltage exceeds another threshold, the power switch apparatus will switch to provide a low voltage to the low-voltage logic control circuit.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which:

FIG. 1 shows the relationship between the input voltage Vin and time when power on;

DETAILED DESCRIPTION OF THE INVENTION

Figure 1:
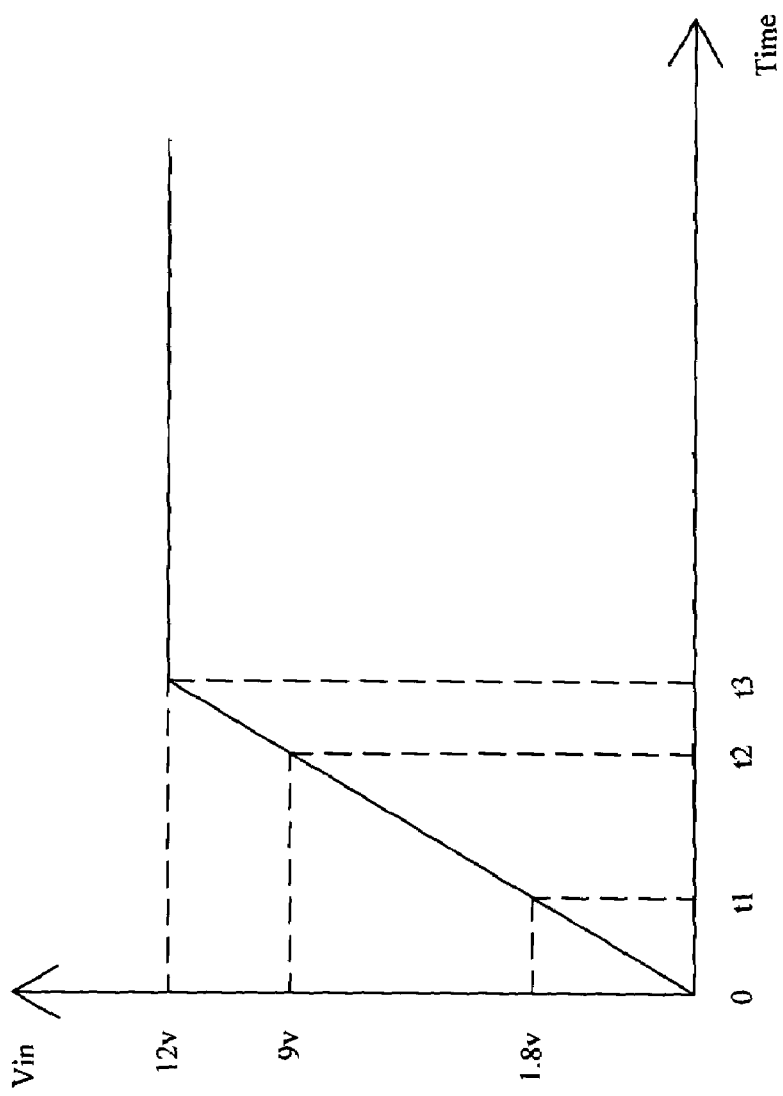
Figure 2:
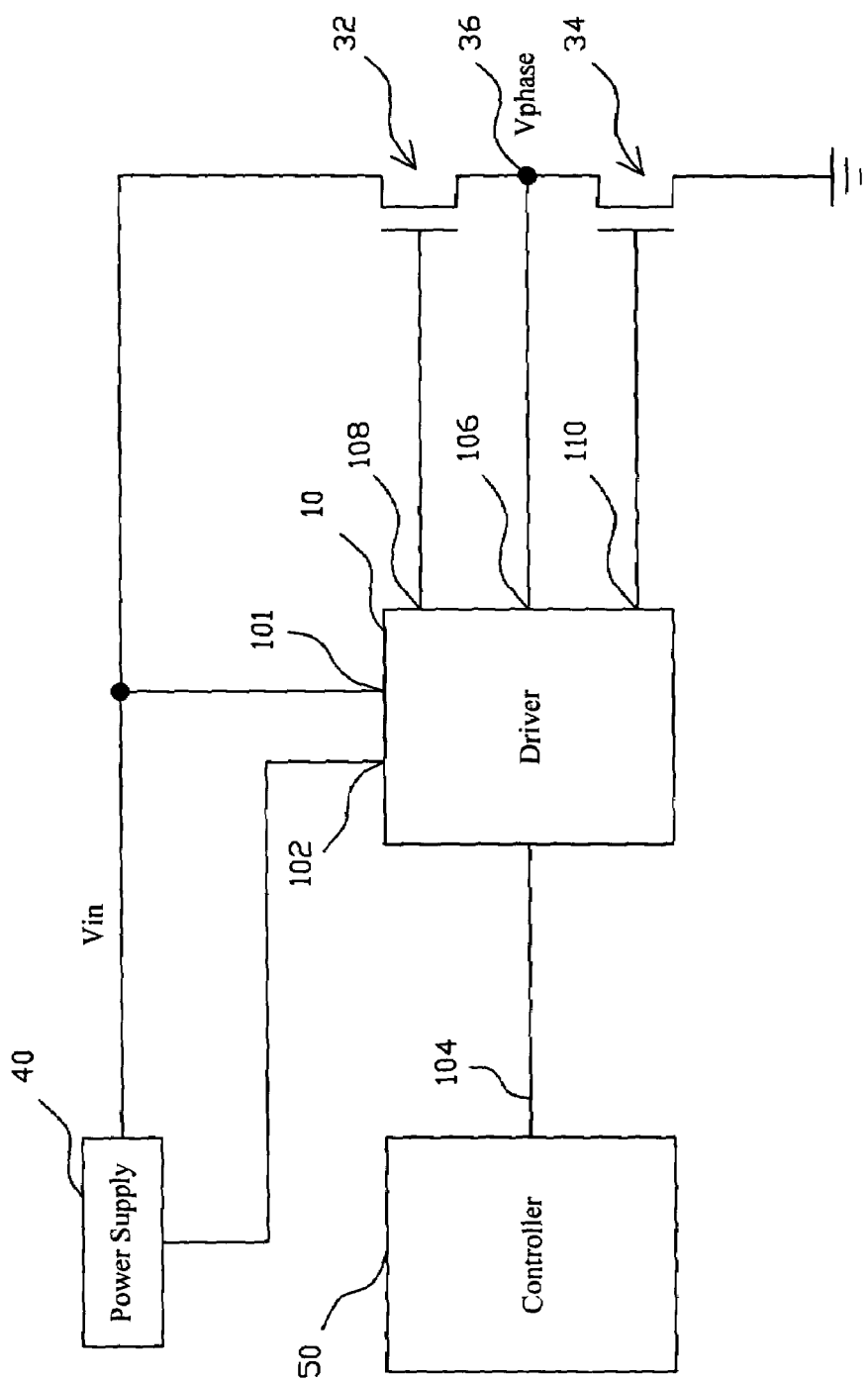
FIG. 2 is the block diagram of a voltage converter according to the present invention.

FIG. 2 is an embodiment converter according to the present invention. A high-voltage power supply 40 provides an input voltage Vin. A high-side transistor 32 is connected between the high-voltage power supply 40 and an output node 36, and a low-side transistor 34 is connected between the output node 36 and a reference potential. The inputs 101 and 106 of a driver 10 receive the input voltage Vin and output voltage Vphase, and the outputs 102, 108 and 110 are connected to the high-voltage power supply 40, high-side transistor 32 and low-side transistor 34. A controller 50 controls the driver 10 through its output 104. When the high-voltage power supply 40 is turned on, the input voltage Vin will rise from 0 V to 12 V, as in the case of FIG. 1. The controller 50 will not operate the driver 10 to switch the high-side transistor 32 and low-side transistor 34 until the input voltage Vin reaches 9 V, and the driver 10 will detect the input voltage Vin and output voltage Vphase in this period. When the input voltage Vin rises to higher than 1.8 V and lower than 9 V, if the output voltage Vphase is detected to reach 1.8 V or higher, the high-side circuit is probably shorted, and hence, the driver 10 will turn on the low-side transistor 34 to have the output node 36 grounded. At the same time, the output node 102 of the driver 10 sends a signal to turn off the high-voltage power supply 40 to protect the load circuit or apparatus connected to the output node 36 of the converter from high voltage. Even the high-voltage power supply 40 cannot accept the signal 102 from the driver 10 or cannot be shutdown by that signal 102, the current through the low-side transistor 34 to ground will force the high-voltage power supply 40 to go into overcurrent mode and thus be shutdown by itself.

Figure 3:
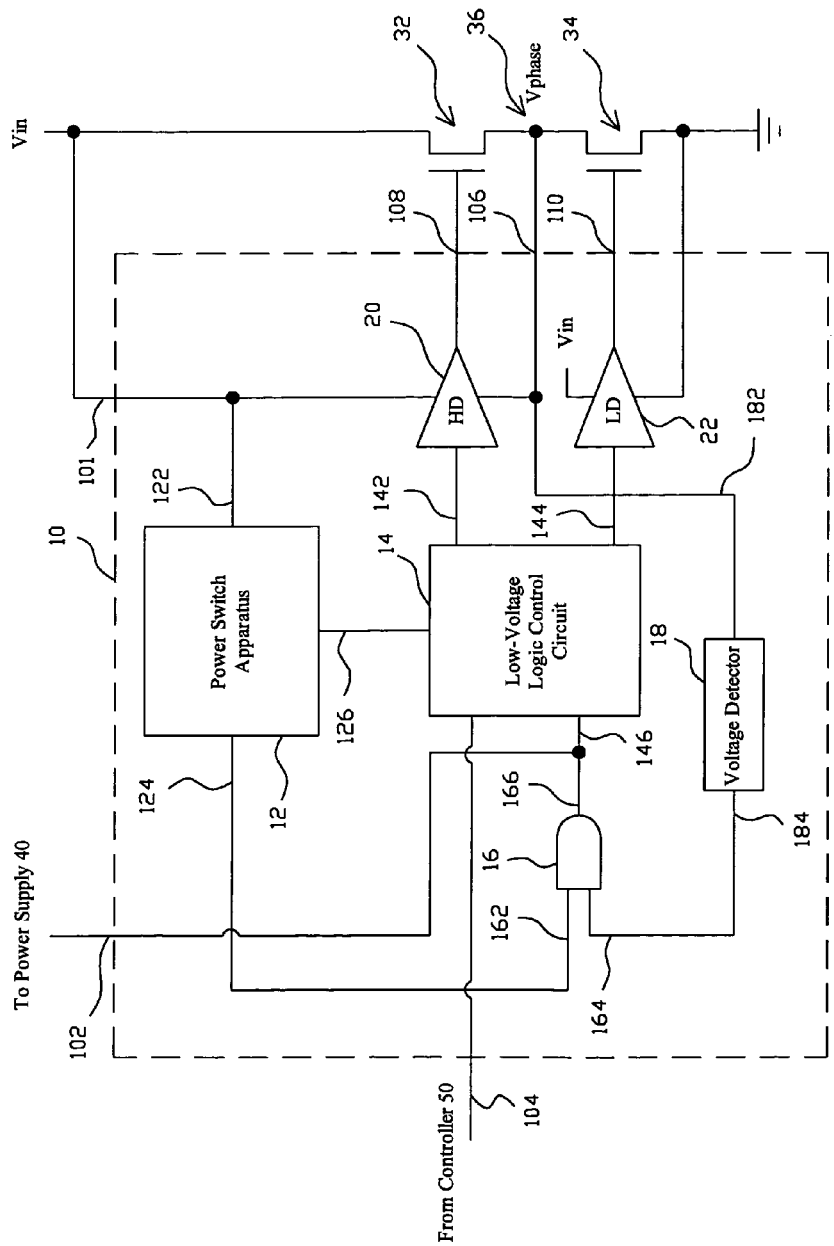
FIG. 3 is an embodiment circuit of the driver in FIG. 2.

FIG. 3 shows an embodiment circuit of the driver 10 in FIG. 2. The driver 10 comprises a power switch apparatus 12 having its input 122 connected with the input voltage Vin and a low voltage built-in thereof, a low-voltage logic control circuit 14 connected with the output 126 of the power switch apparatus 12, a front-end drive circuit 20 connected to the output 142 of the low-voltage logic control circuit 14 to switch the high-side transistor 32, a front-end drive circuit 22 connected to the output 144 of the low-voltage logic control circuit 14 to switch the low-side transistor 34, a voltage detector 18 with its output 182 connected with the output node 36, and an AND gate 16 with its inputs 162 and 164 connected with the output 124 of the power switch apparatus 12 and the output 184 of the voltage detector 18 respectively, and output 166 connected to the input 146 of the low-voltage logic control circuit 14. The AND gate 16 serves as a judgment apparatus to determine if the high-side circuit is shorted during the power on period. The power switch apparatus 12 provides the built-in low voltage to the low-voltage logic control circuit 14 from its output 126. Before the input voltage Vin reaches 9 V, the power switch apparatus 12 produces a first indication signal 124 to the AND gate 16, and the voltage detector 18 detects the output voltage Vphase to produce a second indication signal 184 to the AND gate 16. In this embodiment, when the input voltage Vin ranges between 1.8 V and 9 V, if the output voltage Vphase is detected to reach 1.8 V or higher, the AND gate 16 will send a short signal 166 to the low-voltage logic control circuit 14, and by which the low-voltage logic control circuit 14 will force the low-side transistor 34 conductive to have the output node 36 grounded.

Figure 4:
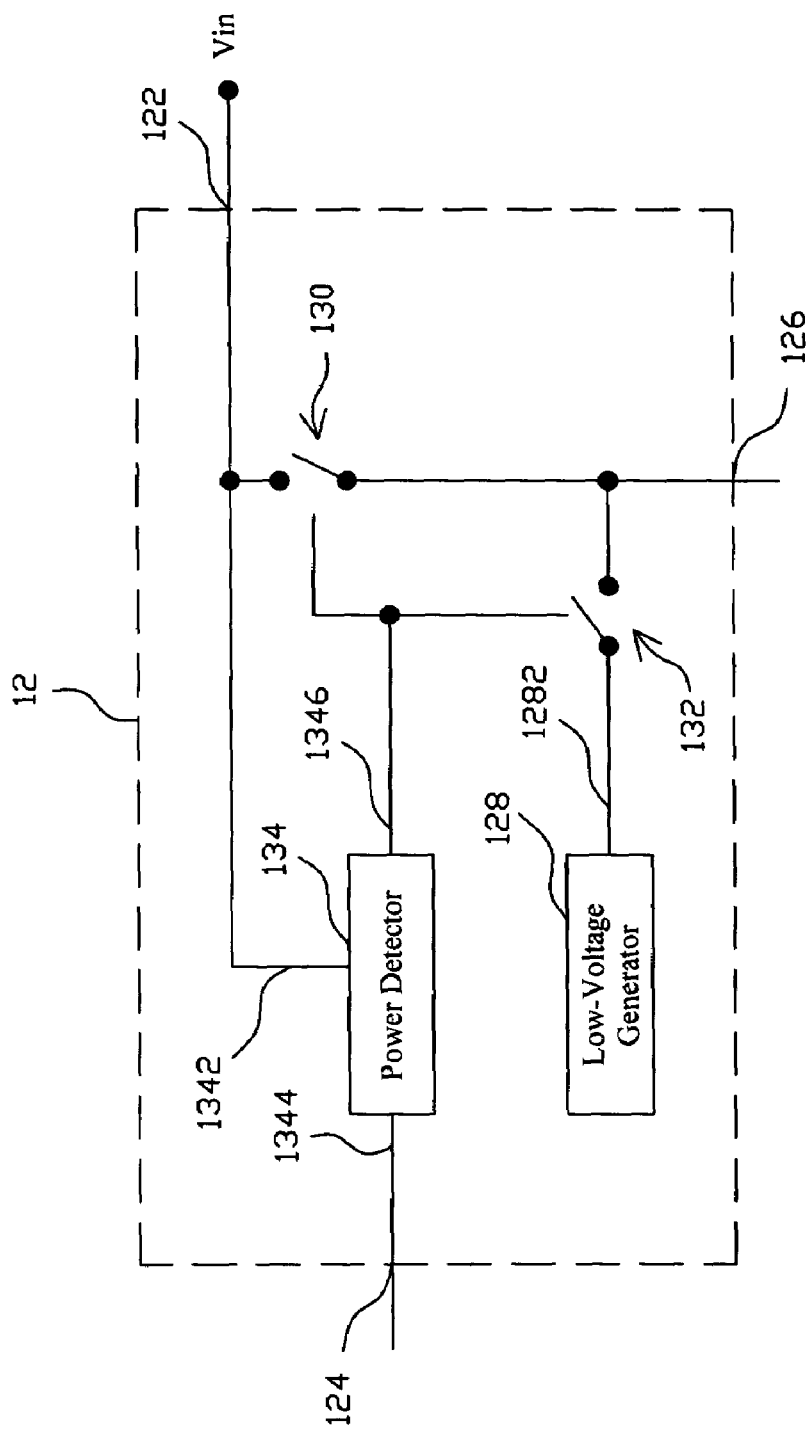
FIG. 4 is an embodiment circuit of the power switch apparatus in FIG. 3.

FIG. 4 shows an embodiment circuit of the power switch apparatus 12 in FIG. 3. The power switch apparatus 12 comprises a low-voltage generator 128 to provide the built-in low voltage 1282, a first switch 130 connected between the input voltage Vin and the output 126 of the power switch apparatus 12, a second switch 132 connected between the low voltage 1282 and the output 126 of the power switch apparatus 12, and a power detector 134 with an input 1342 connected with the input voltage Vin and two outputs 1344 and 1346 connected to the output 124 of the power switch apparatus 12 and the first switch 130 and second switch 132. The power detector 134 detects the input voltage Vin to output the first indication signal 124 and the power signal 1346 by the outputs 1344 and 1346. As described above, the AND gate 16 provides the short signal when the input voltage Vin is between 1.8V and 9V, in the exemplary embodiment, and the output voltage is 1.8V or higher. Accordingly, power detector 134 produces the first indication signal only when input voltage Vin is between 1.8V and 9V. Further, when the input voltage Vin is lower than a predetennined value, for example 5 V, the signal 1346 controls the first switch 130 closed to connect the input voltage Vin to the output 126 of the power switch apparatus 12, and opens the second switch 132 to disconnect the connection between the low voltage 1282 and the output 126 of the power switch apparatus 12. In contrast, when the input voltage Vin is higher than 5 V, the signal 1346 controls the first switch 130 opened to disconnect the connection between the input voltage Vin and the output 126 of the power switch apparatus 12, and closes the second switch 132 to connect the low voltage 1282 to the output 126 of the power switch apparatus 12.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A voltage converter with a high-side short-circuit protection during a power on period, the power on period separated from a normal operating period by an input voltage provided by a high-voltage power supply reaching a first threshold, the voltage converter comprising:

an output node for outputting an output voltage;

a high-side transistor connected between the high-voltage power supply and an output node;

a low-side transistor connected between the output node and a reference potential;

a driver operable during the power on period to detect the input and output voltages and responsive to the input voltage being below the first threshold and above a second threshold and the output voltage reaching a third threshold during the power on period turning on the low-side transistor and turning off the high-voltage power supply, said driver operable after said power on period to switch the high-side and low-side transistors in accordance with a predetermined output voltage; and a controller coupled to the driver and providing thereto a signal after the power on period to switch the high-side and low-side transistors.

2. A converter according to claim 1, wherein the driver comprises:

a power switch apparatus for detecting the input voltage to thereby produce a first indication signal;

a voltage detector for detecting the output voltage to thereby produce a second indication signal;

a judgment apparatus connected with the first and second indication signals for generating a short signal when the input voltage ranges between the first and second thresholds and the output voltage reaches the third threshold; and a low-voltage logic control circuit connected with the short signal to thereby turn on the low-side transistor.

3. A converter according to claim 2, wherein the power switch apparatus comprises:

a low-voltage generator for generating a low voltage;

a first switch connected between the input voltage and the low-voltage logic control circuit;

a second switch connected between the low-voltage generator and the low-voltage logic control circuit; and a power detector for detecting the input voltage to produce the first indication signal and further producing a power signal to control the first and second switches so as to selectively connect the input voltage or low voltage to the low-voltage logic control circuit.

4. A converter according to claim 3, wherein the power signal closes the first switch and opens the second switch to connect the input voltage to the low-voltage logic control circuit when the input voltage is lower than a fourth threshold, and opens the first switch and closes the second switch to connect the low voltage to the low-voltage logic control circuit when the input voltage is not lower than the fourth threshold.

5. A converter according to claim 2, wherein the judgment apparatus comprises an AND gate.

6. A converter according to claim 1, wherein the second threshold is not higher than the third threshold.

7. A method for a high-side short-circuit protection of a voltage converter during a power on period, the power on period separated from a normal operating period by an input voltage provided by a high-voltage power supply reaching a first threshold, the voltage converter including a high-side transistor connected with a low-side transistor in series between the high-voltage power supply and a reference potential, the voltage converter producing an output voltage at an output node between the high-side transistor and the low-side transistor, the method comprising the steps of:

turning on the high-voltage power supply and during the power on period:

detecting the input voltage for producing a first indication signal;

detecting the output voltage for producing a second indication signal; and monitoring the first and second indication signals for turning on the low-side transistor and turning off the high-voltage power supply when the input voltage is below the first threshold and above a second threshold and the output voltage reaches a third threshold.

8. A method according to claim 7, wherein the turning-on of the low-side transistor is implemented by a low-voltage logic control circuit to force the low-side transistor to conduct.

9. A method according to claim 8, further comprising the steps of:

generating a low voltage; and selectively connecting the low-voltage logic control circuit to the input voltage when the input voltage is lower than a fourth threshold or to the low voltage when the input voltage is not lower than the fourth threshold.

* * * * *